April 18, 1944.   W. E. GUNDELFINGER ET AL   2,346,961
ELECTRIC HAND SAW
Filed Oct. 13, 1941   2 Sheets-Sheet 1
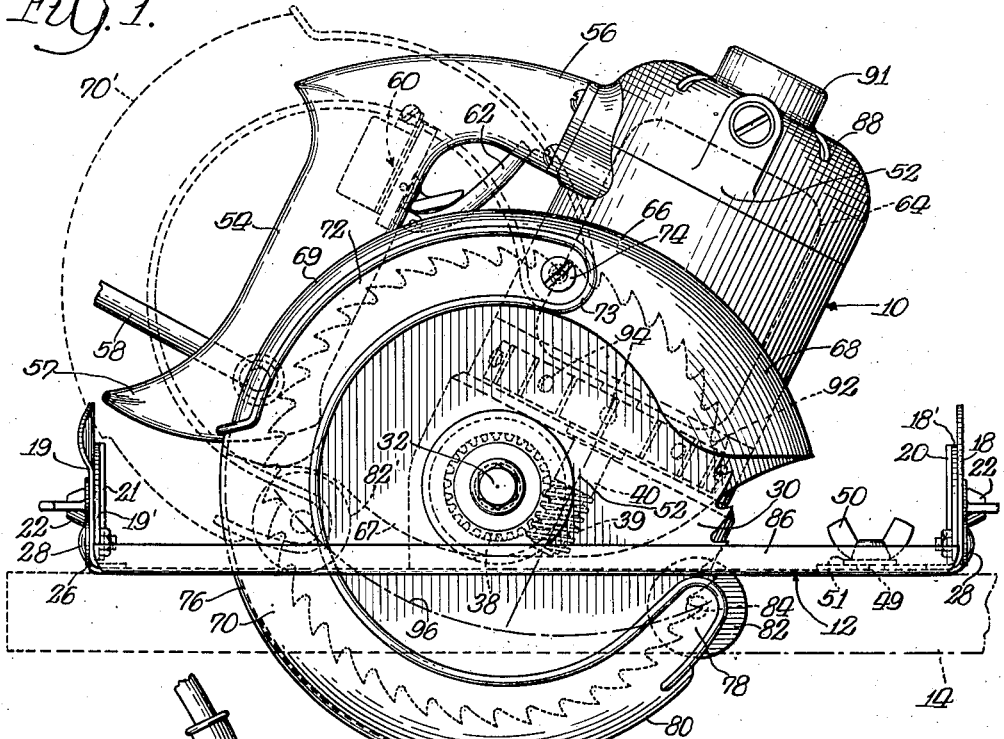
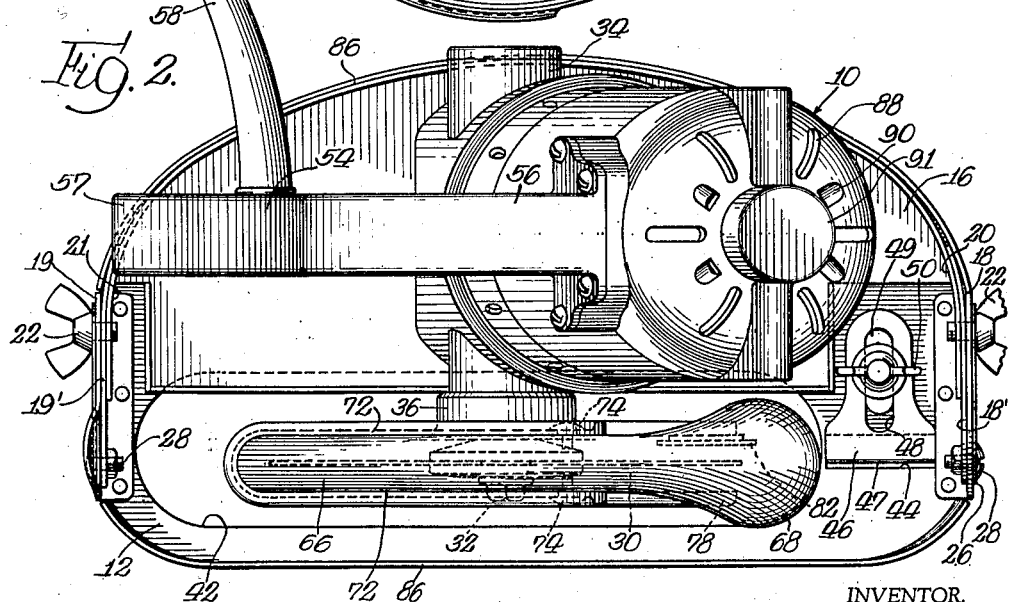
INVENTOR.
William E. Gundelfinger,
Otto Lamb,
BY Bair & Freeman Attys.

April 18, 1944.  W. E. GUNDELFINGER ET AL  2,346,961
ELECTRIC HAND SAW
Filed Oct. 13, 1941  2 Sheets-Sheet 2
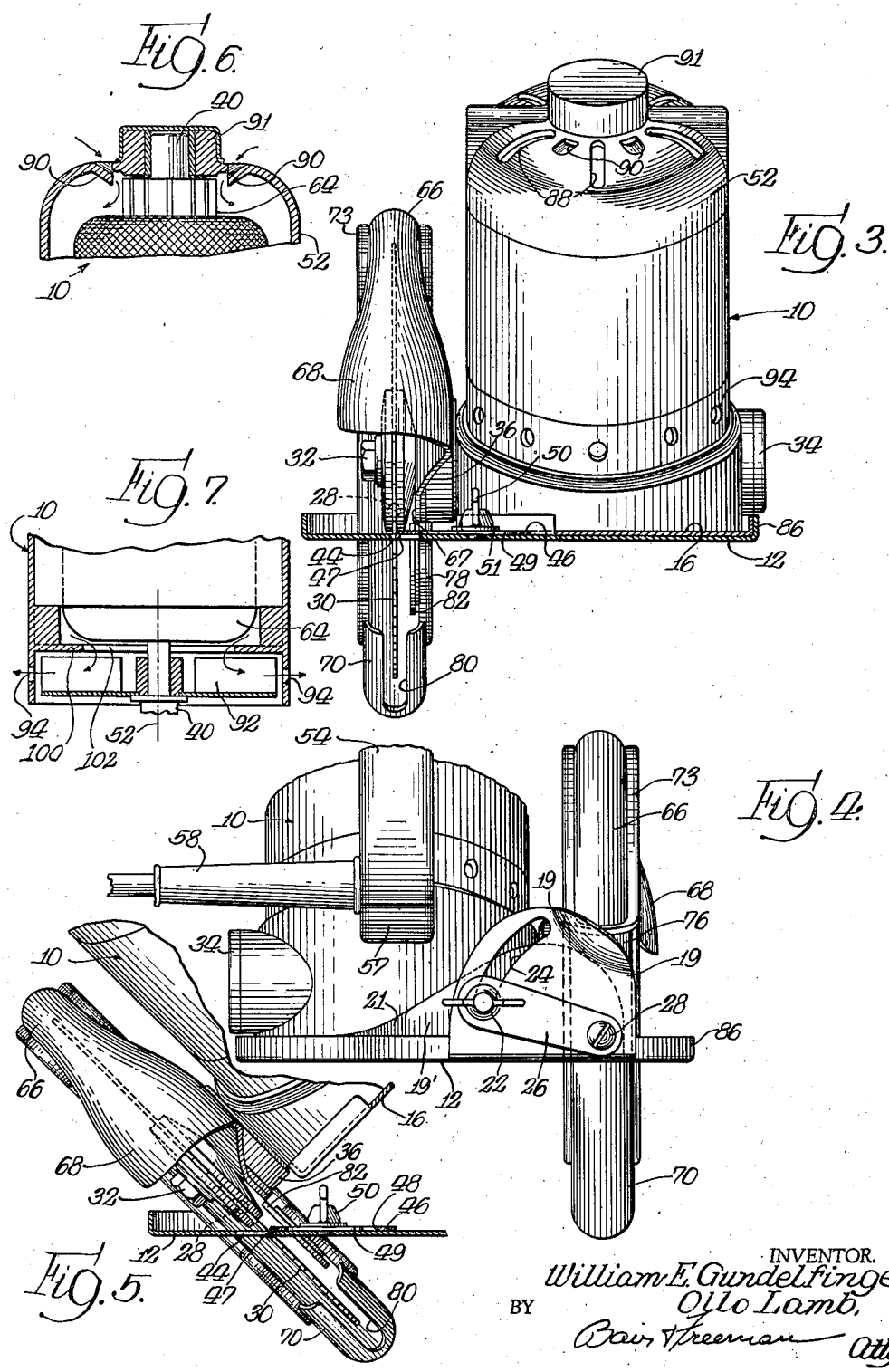
INVENTOR.
William E. Gundelfinger.
Otto Lamb.
BY Patented Apr. 18, 1944

2,346,961

UNITED STATES PATENT OFFICE 2,346,961

ELECTRIC HANDSAW

William E. Gundelfinger and Ollo Lamb, St. Louis, Mo., assignors to Knapp-Monarch Company, St. Louis, Mo., a corporation of Missouri Application October 13, 1941, Serial No. 414,860

5 Claims. (Cl. 143—43)

Our invention relates to power operated saws which are relatively small in general structure so that they can be manipulated by hand in a manner similar to a hand-operated tool.

Among the objects of our invention is to provide a new and improved power operated hand saw wherein the operative parts are balanced upon a handle and a work contacting plate, so that the tool may be easily manipulated with one hand, leaving the other hand of the operator free to grasp the work which is to be sawed.

Another object of our invention is to provide a new and improved power-operated hand saw which is equipped with a two-part guard for the saw blade, providing a permanent guard over the upper exposed portion of the blade and a movable guard over the lower portion of the blade which passes through the work, so joined to the fixed portion of the guard that it will return to a guarding position over the blade as soon as the saw is removed from the work.

Still another object of our invention is to provide a new and improved power-operated hand saw which has a saw mounting tiltable with respect to a work contacting plate so that the blade can be set at an angle in order to make a beveled cut across a board or similar surface to be sawed, it being also included among the objects of our invention to provide a mark follower in order to guide the path of the saw through the work, which is adjustable in order to compensate for a changed position of the saw blade when the saw mounting is tilted relative to the contact plate.

A still further object of our invention is to provide a motor-operated hand saw which has a circular saw blade mounted at one side of a motor equipped with a guard having an enlarged mouth for collecting sawdust which is thrown upwardly by the saw blade, the guard also being provided with an exit so that the sawdust can be discharged below the work and not interfere with the operation or alignment of the saw.

Still further objects include the provision of ventilating means for directing cooling air centrally with respect to the motor and forcing it outwardly from the motor casing after the air has contributed its cooling effect to the motor.

With these and other objects in view, our invention consists in the construction, arrangement and combination of the various parts of our device whereby the objects contemplated are attained, as hereinafter more fully set forth, pointed out in our claims and illustrated in the accompanying drawings. Although the invention is susceptible of a variety of embodiments, it is unnecessary to fully describe and illustrate more than one in order to give a full understanding of the invention both from its structural and functional standpoints. Accordingly, we have illustrated a preferred and desirable embodiment of the invention in the accompanying drawings, in which:

Figure 1 is a side elevational view of the power-operated saw showing by solid lines the normal position of the guard and by dotted lines one of the other positions of a portion of the guard;

Figure 2 is a top view of the device;

Figure 3 is an end view of the device, partly in section, looking toward the leading or cutting side of the tool;

Figure 4 is a partial end view directed toward the trailing side of the device on the side opposite from Figure 3;

Figure 5 is a fragmentary view showing the saw and a portion of the mounting in maximum tilted position;

Figure 6 is a fragmentary view showing the top of the motor casing in section, including the ventilating inlet openings; and Figure 7 is a fragmentary view showing the bottom of the motor casing in section including ventilating outlet openings.

Power-operated saws, and particularly those utilizing electric motors for the source of power, have been designed and used in the past. Saws of this type, however, have customarily been of a relatively heavy construction and somewhat bulky, so that it has usually been necessary to provide two handles, one for each hand, in order that the tool might be properly lifted into position upon the work and guided through a cutting operation. Saws of this type have utilized a motor with direct connections from the motor shaft to the shaft supporting the saw blade and for this reason have necessitated the selection of relatively heavy motors and correspondingly heavy and unbalanced construction. Further still, the power-operated saws heretofore constructed have not been versatile in their adjustment permitting them to be used safely in cutting any sort of boarding, with either a straight or a bevel cut.

In the device chosen to illustrate our invention, there is shown an electric hand saw having a motor casing 10 and a work contacting plate 12 designed to support the electric saw upon a plank 14 comprising the work. Also in the device is a motor mounting 16 which, by way of example, is here shown as comprising a secondary plate conforming in part to the shape of the work-contacting plate, as best shown in Figure 2. The secondary plate in fact supplies the means for mounting the casing 10 in the device.

For connecting the secondary plate to the work-contacting plate, there is provided an upstanding bracket 18 on the leading edge of the work-contacting plate and a corresponding bracket 19 on the trailing edge. The secondary plate 16 is likewise provided with similar brackets 20 and 21. In each case the brackets are positioned respectively in face-to-face contact with stiffening ribs 18' and 19' and secured thereto by means of a bolt and wing nut 22.

The bracket 19, for example, is provided with an arcuate slot 24 as seen in Figure 4, and a corresponding slot is likewise provided in the bracket 18. An arm 26 is pivotally secured by means of a screw 28 to the bracket 19 and the wing nut 22 together with the bolt is attached to the arm on the outer side and the bracket 21 on the inner side. The secondary plate 16 is pivoted about the screw 28 as a center and can be moved from the horizontal position, shown in Figures 1 and 2, to a variety of tilted positions up as great as an angle of 45° from horizontal, as shown in Figure 5.

As shown, the casing 10 is connected directly to the secondary plate 16 and serves as a supporting structure for mounting the operative parts.

A circular saw blade 30 has a drive shaft 32 which is mounted on the motor casing in the journal boxes 34 and 36, the drive shaft for the saw being substantially parallel to the plane of the secondary plate 16. As indicated in Figure 1, a pinion 38 on the saw blade drive shaft is driven by a worm gear 39 attached to the motor shaft 40, so that a motor having a relatively great number of revolutions per minute can be used to operate a saw blade at a correspondingly reduced number of revolutions per minute.

As shown in Figures 2 and 3 particularly, the work-contacting plate 12 is provided with an aperture 42 designed to receive the saw blade, and as shown in Figure 2 the aperture is relatively wide.

Also on the work-contacting plate there is provided a mark follower comprising a slot 44 formed in the work-contacting plate and an adjustable element 46 having an edge 47 forming one side of the mark-following slot. The adjustable element is provided with an elongated aperture 48 and a screw 49 secured to the work-contacting plate extends upwardly through the aperture to a point where a wing nut 50 and washer 51 can be applied. In the position shown in Figure 2, the adjusting element is set for the saw blade when in normal position of operation.

As indicated particularly in Figures 1 and 2, the motor extends upwardly from the plate so that its axis 52 forms an acute angle with the plate on the leading side of the work-contacting plate. The axis of the casing makes its junction with the plate on the leading side of the axis of the saw blade drive shaft. A corresponding obtuse angle is formed between the axis of the casing and the surface side of the work-contacting plate.

In order to properly balance the electric saw, a pistol grip handle 54 has an upper end 56 attached to the upper end of the motor casing at the rear side. The opposite end 57 of the pistol grip extends rearwardly and downwardly to a point spaced a slight distance above the trailing side of the work-contacting blade. The axis of the elongated portion of the pistol grip handle is approximately parallel to the axis of the motor casing and it will be apparent that it is located on the opposite side relatively of the saw blade drive shaft. A conduit 58 is attached to the lower end of the handle and contact is made through the handle to a trigger switch 60 which has a finger-operated element 62 in an angle formed at the top portion of the pistol grip. From the trigger switch, the current is conducted through a conduit (not shown) to the motor within the casing 10. The armature of the motor is indicated by the reference character 64.

In order to properly protect the saw blade, there is provided a guard comprising a relatively short arcuate channel member 66, which has a wing section 67 secured to the motor casing, as best seen in Figure 3. The arcuate channel is likewise provided with an enlarged mouth 68 opening downwardly relative to the work-contacting plate at a point adjacent the cutting edge of the saw blade. The arcuate channel has a tail portion 69 which extends rearwardly relative to the circumference of the blade, as shown best in Figure 1. It will be apparent that the arcuate channel covers substantially the upper side of the saw blade and is permanently positioned relative to the blade.

A second relatively long arcuate channel member 70 is shown covering the remaining portion of the saw blade. The second channel member has an upper end comprising side walls 72 and an open bottom. The side walls 72 lie on either side of the sides of the first arcuate member and are pivotally secured to the sides of the first arcuate member by means of pivot pins 74. Lateral flanges 73, as seen in Figure 3, are provided on the side walls to give added strength.

At its midportion, the longer arcuate member is provided with a bottom 76 for the channel, which extends over the teeth of the saw blade on the lower side of the saw. The other end 78 of the longer arcuate member is free and has a cutaway bottom portion 80 to permit the ejection of sawdust.

At the free end 78 there is provided a roller 82 pivotally mounted between the opposite side walls of the free end of the member by means of a pin 84 at one side thereof.

For added strength, the outer rims of the work-contacting plate are provided with upturned edges 86 which likewise serve in a measure to protect the cutting edge of the saw.

In order that the high speed motor with which the tool is provided may be kept properly cooled, there are provided lateral ventilating openings 88 on the upper side of the motor casing and central openings 90 which extend from opposite sides of a journal boss 91 inwardly toward the armature of the motor. The direction of the central ventilating openings is best shown in Figure 6. A fan 92 may be provided within the motor casing for drawing air inwardly through the openings 90 and then expelling it outwardly through exit ports 94 at the lower portion of the motor casing. It will also be noted that the enlarged mouth of the shorter arcuate guard member shields the ventilating openings in the motor casing from possible contact with sawdust created by the cutting edge of the saw.

The fragmentary sectional view Figure 7 shows the lower portion of the motor casing including the fan and the lower portion of the armature. Between the fan and the armature is a baffle 100 which is provided with a central opening 102 considerably smaller in diameter than the diameter of the armature. The baffle in effect creates an enclosure within which the fan operates and assists to direct air centrally relative to the armature and the fan from which it passes outwardly through the ventilating outlet slots 94. The purpose of directing air in this manner is to cool the commutator which is located in the rear of the motor casing. In motors of this kind the commutator develops a great deal of heat due to the very rapid rotation of the armature and it is essential that cooling air be provided for it.

In operation, the electric hand saw is normally set up so that the supplemental plate or motor mounting rests upon the work-contacting plate in such a position that the drive shaft for the saw blade is parallel to the surface of the work. In this position the saw blade is substantially perpendicular to the edge of the work and is advanced across the work with the leading edge of the mounting proceeding ahead of the cutting edge of the saw. It will be noted, as shown in Figure 1, that a portion of the leading edge can be rested upon the upper surface of the work 14 before the saw blade is brought into contact with it. Likewise in the leading edge, the edge 47 of the slot 44 can be rested directly on the mark which the saw blade is to follow in order that the cut may be true.

As the cutting edge of the blade approaches contact with the work, the roller 82 will come into contact with the edge of the work and be pushed backwardly by it. When the roller is pushed backward, the longer arcuate guard member is tilted about the axis of the screws 74 to a position slightly removed from the teeth of the saw on the lower side. At the teeth of the saw gradually cut into the work, the edge of the work pushes the roller 82 still further back and correspondingly urges the longer arcuate member further and further away from the teeth of the saw blade, the axis of the roller following the dot-and-dash line 96 which is in the form of an arc about the screw 74 as a pivot point. During such engagement of the saw with the work, the roller will be gradually pushed to the dotted position 82' of Figure 1, in which position the roller will roll upon the upper surface of the work for the remaining portion of the cut. In this position the long arcuate member will be entirely removed from a position covering the lower side of the saw blade, to the position indicated as 70', but since the lowered side of the saw will be primarily embedded on the work, the protection is not essential. Meanwhile, the upper side of the saw blade is effectively covered by the tail portion of the fixed arcuate guard member. With the saw blade rotating in a counterclockwise direction as viewed in Figure 1, sawdust thrown upwardly from the work will enter the enlarged mouth 68 of the upper guard member and travel backward within the channel of the upper guard member, thence to the lower guard member and finally out through the outlet 80 on the underneath side of the work, during the initial portion of the cutting operation. As the cutting operation progresses, the longer arcuate guard element will be moved as above described to a position as indicated in dotted lines in Figure 1 and the sawdust will be discharged above the work through the outlet 80. As soon as the saw is withdrawn from the kerf formed during the cutting operation, the longer arcuate guard member will fall back into the position indicated in full lines in Figure 1. By virtue of this arrangement, the sawdust will thus be prevented from being sucked inwardly through the ventilating openings 88 and 90 in the motor casing.

When it is desired to make a beveled saw cut across the work, the supplemental plate 16 can be tilted relative to the work-contacting plate 12. Since the saw blade and motor are mounted on the supplemental plate, they will likewise be tilted with it. A tilted position is shown in Figure 5. When the plates are tilted relative to each other, they pivot about the axis of the screws 28 from positions in contact with each other to a position where one is tilted at an angle of about 45° relative to the other. Obviously, any tilted position between zero and 45° can be assumed. The wing nut 22 is first loosened to permit free tilting and then, when the proper tilt has been determined, the wing nut is tightened in order to lock the plates in the respective tilted positions relative to each other.

As shown particularly in Figure 5, when the saw blade is tilted out of its position perpendicular to the work, the cutting edge of the blade will contact the work at a position slightly to one side of a line extending from the blade when in perpendicular position. Consequently, the kerf of the saw will follow a line slightly to one side of the edge 47 of the mark follower, as shown in Figure 2.

In order to properly set the mark follower in order to guide the saw, as soon as the angle of tilt has been established the wing nut 50 is loosened and the adjusting element 46 is moved upwardly, as viewed in Figure 2, until its edge 47 is in alignment with the cutting edge of the saw blade. The adjusting element can then be tightened in place by screwing down the wing nut, and the path of the saw blade guided by the edge 47 during the making of a biased cut.

There has thus been provided a portable power-operated hand saw of relatively simple construction, which is properly balanced for hand operation, properly protected with regard to the working parts, and provided with adjustments permitting it to be used for a variety of types of cuts.

Some changes may be made in the construction and arrangement of the parts of our device without departing from the real spirit and purpose of our invention, and it is our intention to cover by our claims any modified forms of structure, or use of mechanical equivalents, which may be reasonably included within their scope.

We claim as our invention:

1. An electric hand saw comprising a motor mounting having an electric motor mounted therein, a power transmission means for transmitting power from the motor to the saw, a contacting plate for engaging the surface of the work and means for attaching said motor mounting to the plate, a circular saw blade having a drive shaft mounted on said motor mounting and having a portion of the blade extending below the work contacting plate, a guard member for the blade comprising a short arcuate channel element positioned around the upper side of the blade at its outer edge, secured to the motor mounting, and having an opening adjacent the cutting edge for reception of saw dust, a second arcuate channel member having bottom and sides encompassing the lower side of the blade, one end of said second channel member being pivotally secured to the short channel member above the drive shaft, the other end of said second channel member having a normal inoperative position below the drive shaft and adjacent said work contacting plate and the cutting edge of said blade, and a roller on said other end for engagement with the edge of the work and adapted to tiltably shift said second channel member away from the work and the saw blade as the sawing operation progresses, said roller traveling in a path relative to said work contacting plate which remains close to the under surface of said plate during substantially all of the time that any part of the saw blade is exposed below the plate as the saw advances into the work.

2. An electric hand saw comprising a casing having an electric motor mounted therein, a drive shaft and power transmission means for transmitting power from the motor to the saw, a contacting plate for engaging the surface of the work and means for mounting said casing on the plate, a circular saw blade having a drive shaft mounted on said casing, said blade having a portion extending below the work contacting plate, the contacting plate having an aperture to receive the blade, and a guard member for the blade comprising a relatively short arcuate channel element positioned around the upper side of the blade at its outer edge and secured to the housing having an enlarged mouth adjacent the cutting edge for reception of saw dust, a relatively long arcuate channel member having a circumferential portion exceeding 180° wherein the bottom and sides of the channel encompass the adjacent outside edge of the blade, one end of said long channel member being pivotally secured to the short channel member at a point adjacent the periphery of the saw blade and above and on the side of the drive shaft nearest the cutting edge of the blade, the other end of said long channel member having a normal inoperative position below and on the same relative side of the drive shaft adjacent the work contacting plate and the cutting edge of said blade, and means on said other end of the long channel member adapted to engage the edge of the work and adapted to tiltably shift the long channel member away from the work with the path of the member such that it keeps covered, that portion of the cutting edge of said blade below said contacting plate which has not yet entered the work as the sawing operation progresses.

3. In an electric hand saw having a circular saw blade mounted on a horizontal drive shaft, a mounting for the operative parts and a work-contacting plate positioned between the drive shaft and the lower rim of the saw blade, the combination of a guard for the outer marginal portion of the saw blade comprising a pair of arcuate channel members, one of said members being fixed to the mounting and the other of said members being pivotally movable and having one end overlapping substantially one-half of said one member with one end of the sides of said other member pivoted at substantially the center of said one of said members, one of said members extending around one portion of the blade circumference and the other extending around another portion of said circumference, said movable member having free movement in a pivotal direction, a work-contacting element on said free end adapted to contact the edge of the work and travel rearwardly in a path closely adjacent the under surface of said work contacting plate until the rear edge of the saw blade below the plate enters the work, the movable arcuate member assuming a plurality of positions tilted rearwardly and upwardly as said movable arcuate member is urged away from the blade by progressive contact of the work-contacting element with the work during a sawing operation.

4. In an electric hand saw having a circular saw blade mounted on a horizontal drive shaft, a mounting for the operative parts and a work-contacting plate having a leading and a trailing side positioned between the drive shaft and the lower rim of the saw blade, the combination of a guard for the saw blade comprising an arcuate channel member having a fixed position on the device extending over the blade on one side of the plate, a second arcuate channel member having one end pivotally secured to the sides of said first arcuate member at a point intermediate its ends, said second arcuate member having a closed bottom at the mid-portion only thereof extending around the blade on the other side of the plate and having a free end movable in an arcuate path about its connected end, a work-contacting element on the free end of said second arcuate member in substantial alignment with the blade adapted to contact the edge of the work and, due to the pivot point location, move along and closely adjacent the plate until the entire portion of the blade below the plate has entered the work, said second arcuate member assuming a plurality of positions tilted rearwardly and upwardly as it is urged away from the blade by progressive contact of the work-contacting element with the work during a sawing operation and being adapted to pivot back to normal position when the saw is removed from the work.

5. In an electric hand saw having a circular saw blade mounted on a horizontal drive shaft for rotation upwardly at the cutting edge, a mounting for the operative parts and a work-contacting plate having leading and trailing sides parallel to the drive shaft positioned between said shaft and the lower outside edge of the saw blade, the combination of a guard for the saw blade comprising an arcuate channel member fixed to the mounting having an enlarged mouth around the saw blade above and adjacent the plate on the leading side thereof for collection of saw dust and a tail portion of smaller cross-sectional size extending over the upper side of the blade from the mouth toward the trailing side of the plate, a second arcuate channel member outside the first one and having disconnected sides at one end pivotally secured to the sides of said first arcuate member above the drive shaft, adjacent the periphery of the saw blade and on the leading side of the plate, said second arcuate member having a closed bottom at the mid-portion extending around the lower side of the blade from the tail portion of said first arcuate member toward the cutting edge of the blade, the other end of said second arcuate member having an open bottom forming an exit for saw dust and having free movement in a pivotal direction, a roller pivoted to one side of said other end in alignment with the blade adapted to contact the edge of the work, said second arcuate member assuming a plurality of positions tilted rearwardly and upwardly with said first arcuate member substantially filling the space between said disconnected sides of said second arcuate member to guide it in its pivotal movement as it is urged away from the blade by progressive contact of the roller with the work during a sawing operation and being adapted to pivot back to normal position by gravity when the saw is removed from the work.

WILLIAM E. GUNDELFINGER.
OLLO LAMB.